United States Patent
Cuomo et al.

(10) Patent No.: US 6,286,043 B1
(45) Date of Patent: Sep. 4, 2001

(54) USER PROFILE MANAGEMENT IN THE PRESENCE OF DYNAMIC PAGES USING CONTENT TEMPLATES

(75) Inventors: Gennaro Cuomo, Apex; Binh Q. Nguyen, Cary; Sandeep K. Singhal, Raleigh, all of NC (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/140,226

(22) Filed: Aug. 26, 1998

(51) Int. Cl.[7] .................................................... G06F 15/16
(52) U.S. Cl. ........................ 709/223; 709/217; 709/224; 709/305
(58) Field of Search ........................ 709/219–223, 709/224, 217, 305

(56) References Cited

U.S. PATENT DOCUMENTS

| | | | |
|---|---|---|---|
| 5,706,502 | * | 1/1998 | Foley et al. .............................. 707/10 |
| 5,894,554 | * | 4/1999 | Lowery et al. .......................... 707/10 |
| 5,958,008 | * | 9/1999 | Pogrebisky et al. ................... 709/223 |
| 5,996,007 | * | 11/1999 | Klug et al. ............................. 709/218 |
| 6,067,559 | * | 5/2000 | Allard et al. .......................... 709/202 |
| 6,081,840 | * | 6/2000 | Zhao ..................................... 709/224 |
| 6,128,655 | * | 10/2000 | Fields et al. .......................... 709/219 |
| 6,138,155 | * | 10/2000 | Davis .................................... 709/224 |

\* cited by examiner

*Primary Examiner*—Krisna Lim
(74) *Attorney, Agent, or Firm*—A. Bruce Clay; Marcia L. Doubet (57) ABSTRACT

A technique, system, and computer program for collecting information about user behavior in the presence of dynamic page content. Regular expressions are used to describe dynamic page content and classify pages into equivalence classes. A Web site monitoring tool using this collection technique to create user profiles can then contend with a range of dynamic page content.

27 Claims, 6 Drawing Sheets

Template:                                                       500

```
<HTML>       501  503   504
<BODY>
<H1>Welcome to the Home Page</H1>
You are visitor <!--*--> since <!--**-->
<p> 502                              505
We thank you, <!--**-->, for your patronage today.
</BODY>
</HTML>                                              510
           507  508
```

FIG. 5B

Version 1 that matches:

```
<HTML>
<BODY>
<H1> Welcome to the Home Page</H1>
You are visitor 13,438 since Friday, November 8, 1993.
<p>  522   523                        525
We thank you, Joe Smith, for your patronage today.
</BODY>          528
</HTML>
```

FIG. 5C

Version 2 that matches:

```
<HTML>                  543
<BODY>
<H1>Welcome to the Home Page</H1>
You are visitor 13,439 since Friday, November 8, 1993.
<p> 542                                 545
We thank you, George Rogers, for your patronage today.
</BODY>                 548
</HTML>
```

FIG. 5D

Version 3 that does not match:

```
<HTML>
<BODY>
<H1> Welcome to the Home Page</H1>
You are visitor 13,440 since Friday, November 8, 1993.
<p> 562  563                            565
We thank you, Linda Simons, for your patronage today.
<p>
          568
    Because you are a special customer, we are offering an exclusive
580 offer just for you: Click <A HREF="offer.html"> here</A> to learn
    more!
</BODY>
</HTML>
```

USER PROFILE MANAGEMENT IN THE PRESENCE OF DYNAMIC PAGES USING CONTENT TEMPLATES

BACKGROUND OF THE INVENTION

1. Field of the Invention

The present invention relates to a computer system, and deals more particularly with a method, system, and computer program for collecting information about user behavior in the presence of dynamic page content.

2. Description of the Related Art

Today, thousands of businesses and millions of people are using the Internet on a daily basis. The Internet is a vast collection of computing resources, interconnected as a network, from sites around the world. The World Wide Web (referred to herein as the "Web") is that portion of the Internet which uses the HyperText Transfer Protocol ("HTTP") as a protocol for exchanging messages. (Alternatively, other protocols such as the "HTTPS" protocol can be used, where this protocol is a security-enhanced version of HTTP.)

A user of the Internet typically accesses and uses the Internet by establishing a network connection through the services of an Internet Service Provider (ISP). An ISP provides computer users the ability to dial a telephone number using their computer modem (or other connection facility, such as satellite transmission), thereby establishing a connection to a remote computer owned or managed by the ISP. This remote computer then makes services available to the user's computer. Typical services include: providing a search facility to search throughout the interconnected computers of the Internet for items of interest to the user; a browse capability, for displaying information located with the search facility; and an electronic mail facility, with which the user can send and receive mail messages from other computer users.

The user working in a Web environment will have software running on his computer to allow him to create and send requests for information, and to see the results. These functions are typically combined in what is referred to as a "Web browser", or "browser". After the user has created his request using the browser, the request message is sent out into the Internet for processing. The target of the request message is one of the interconnected computers in the Internet network. That computer will receive the message, attempt to find the data satisfying the user's request, format that data for display with the user's browser, and return the formatted response to the browser software running on the user's computer.

This is an example of a client-server model of computing, where the machine at which the user requests information is referred to as the client, and the computer that locates the information and returns it to the client is the server. In the Web environment, the server is referred to as a "Web server". The client-server model may be extended to what is referred to as a "three-tier architecture". This architecture places the Web server in the middle tier, where the added tier typically represents data repositories of information that may be accessed by the Web server as part of the task of processing the client's request. This three-tiered architecture recognizes the fact that many client requests do not simply require the location and return of static data, but require an application program to perform processing of the client's request in order to dynamically create the data to be returned. In this architecture, the Web server may equivalently be referred to as an "application server".

When this scenario is implemented using the Internet, the browser running on the client's machine accepts the data it will display in response to the user's request, by convention, as a data stream formatted using the HyperText Markup Language ("HTML"). HTML is a standardized notation for displaying text and graphics on a computer display screen, as well as providing more complex information presentation such as animated video, sound, etc. Because browsers expect an incoming response to be formatted using HTML, servers generate their response in that format. The browser processes the HTML syntax upon receipt of the file sent by the server, and creates a Web page according to the instructions specified by the HTML commands.

Web pages were originally created to have only static content. That is, a user requested a specific page, and the predefined contents of that page were located by a Web server and returned for formatting and display at the user's computer. To change the page content or layout, the HTML syntax specifying the page had to be edited. However, the Web is moving toward dynamic page content, whereby the information to be displayed to the user for a given page can be generated dynamically, without changing the HTML.

With dynamically-generated content, a request for the Web page stored at a given Uniform Resource Identifier ("URI") or Uniform Resource Locator ("URL") may result in a wide variety of page content being returned to the user. (References to "URL" hereinafter are intended to include URIs unless stated otherwise.) One common, simple use of dynamic page content is the "visitor counts" which are often displayed on Web pages, with text such as "You are the 123rd visitor to this site since Jan. 1, 1997"(where the count of visitors is accumulated at the server and inserted into the HTML syntax before returning the page to the user). Other simple uses include displaying the current date and time on the page. More advanced techniques for dynamic content allow servers to provide Web pages that are tailored to the user's identification and any profiles of personal information he may have created. For example, servers providing travel reservation services commonly store information about the travel preferences of each of their users, and then use this information when responding to inquiries from a particular user. Dynamic content may also be based upon user classes or categories, where one category of users will see one version of a Web page, and users in another category will see a different version—even though the same URL was used to request the Web page from the same server. For example, some Web server sites provide different services to users who have registered in some manner (such as filling out an on-line questionnaire) or users who have a membership of some type (which may involve paying a fee in order to get enhanced services, or more detailed information). The difference in dynamic content may be as simple as including the user's name in the page, as a personalized electronic greeting. Or, the dynamic content may be related to the user's past activities at this site. On-line shopping sites, for example, may include a recognition for repeat shoppers, such as thanking them for their previous order placed on some specific day.

A number of techniques for providing dynamic page content exist. One such technique is use of an Active Server Page ("ASP") on a Microsoft Web server, which detects a specific command syntax in an HTML page and process the embedded commands before returning the page to the user. Another technique is use of servlets, which are relatively small executable code objects that can be dynamically invoked by code running on the server. Servlets typically perform some specialized function, such as creating page content based on dynamic factors. Or, Dynamic Server Pages ("DSPs") may be used to create dynamic content using compiled Java on Java-aware Web servers. ("Java" is a trademark of Sun Microsystems, Inc.) CGI ("Common Gateway Interface") scripts and applications may also be used as sources of dynamic content.

Dynamic page content that is customized to an individual user is made possible by software running at a Web server which tracks visitors to the Web site. This tracking enables a Web administrator to monitor who is visiting the site, what content they request to see, how that content affects their behavior (whether they exit the site from a specific page, link from one page to another, etc.), and so forth. By monitoring visitors in this way, the server applications can provide targeted marketing and customized information to each visitor. As electronic commerce becomes more prevalent on the Web, tracking this type of user behavior information will be increasingly more valuable.

Many tools exist today for monitoring user access to Web servers. These monitoring tools typically generate traces of URL requests from individual user sessions. This information is recorded in a file, database, or other repository accessible to the server applications. However, existing tools are oriented towards static page content, where tracking the URL of the request provides the ability to reconstruct what content was displayed to the user as he navigated around the site. When dynamic page content is displayed, recording the URL request flow is insufficient to provide a record of this information. As stated previously, requests to a single URL may result in very different Web page content based upon factors such as the requesting user's identity, so that storing the URL does not provide meaningful data for monitoring the user's behavior.

Accordingly, a need exists for a technique by which information about user behavior in the presence of dynamic page content can be collected. A Web site monitoring tool using this collection technique to create user profiles must be able to contend with a range of dynamic page content. The proposed technique uses regular expressions to describe dynamic page content and classify pages into equivalence classes.

SUMMARY OF THE INVENTION

An object of the present invention is to provide a technique with which information about user behavior in the presence of dynamic page content can be collected.

Another object of the present invention is to provide a Web site monitoring tool to create user profiles using this collection technique.

It is another object of the present invention to provide a technique which can contend with a range of dynamic page content.

It is a further object of the present invention to provide a technique that uses regular expressions to describe page content and classify dynamic pages into equivalence classes.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a software-implemented technique for use in a computing environment capable of having a connection to a network, for profile management in the presence of dynamic page content. This technique comprises comparing one or more content templates to one or more dynamically-generated pages, and creating a user profile entry using a result of the comparing. Preferably, each of the content templates defines an equivalence class, and the equivalence class is defined using one or more regular expressions to describe page content in each of the content templates. Further, the user profile entry preferably comprises information about a behavior pattern of a user, and a collection of the user profile entries is preferably for use by a site monitoring tool. The comparison may further comprise using a selected one of the templates based on a Uniform Resource Locator which was used to access the page; alternatively, each page may be compared to each of the templates until either a match or a failure condition is detected, without regard to a Uniform Resource Locator which was used to access the page. The comparison may use one or more context-specific values. A regular expression may indicate wild-card treatment for a single token, or for at least one token. Optionally, a new content template may be created from the page when the comparison has a negative result.

The present invention will now be described with reference to the following drawings, in which like reference numbers denote the same element throughout.

DESCRIPTION OF THE PREFERRED EMBODIMENT

Figure 1:
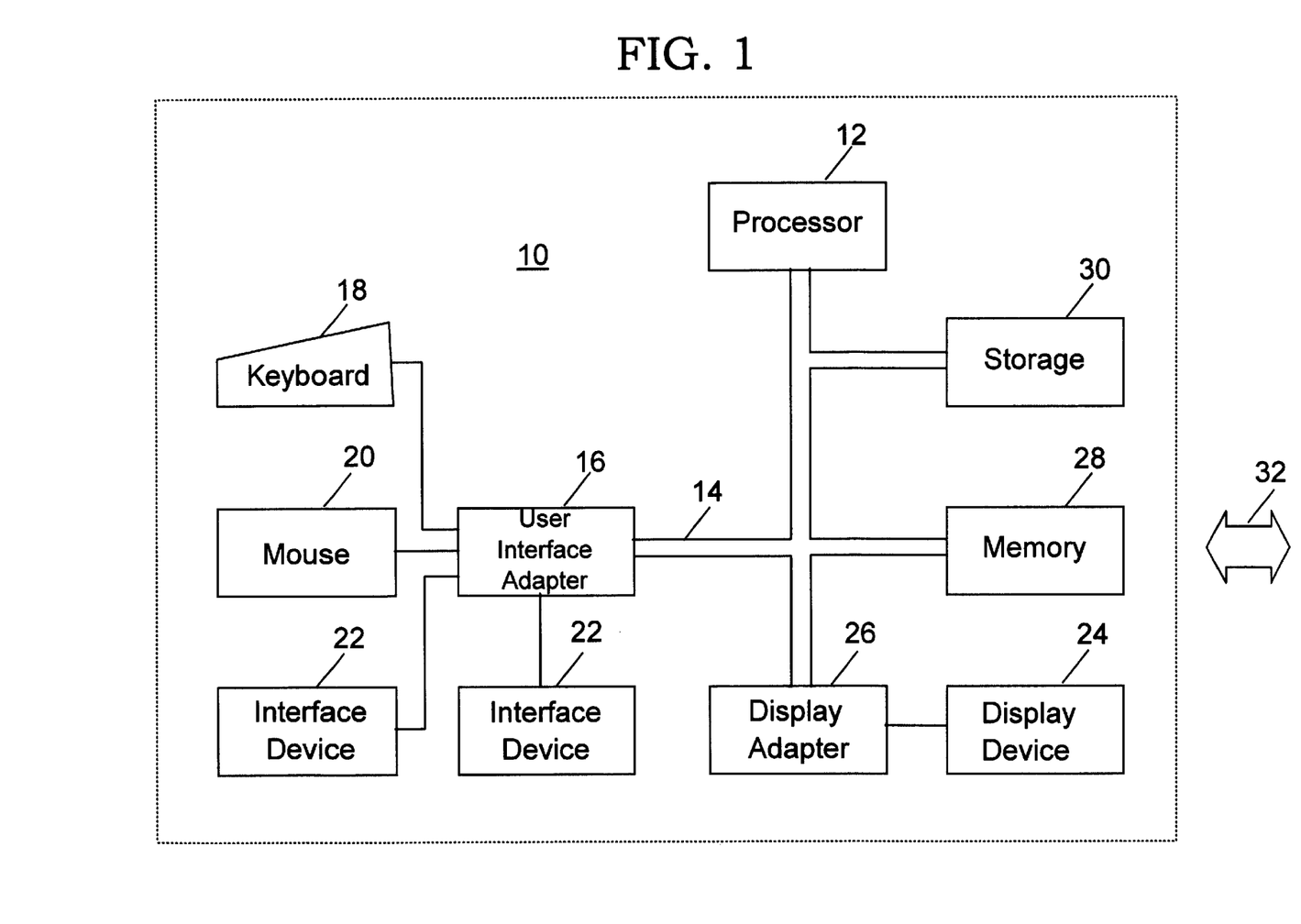
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 communicates via a communications channel 32 with other computers or networks of computers.

The workstation 10 may be associated with such other computers in a local area network (LAN) or a wide area network, or the workstation 10 can be a client in a client/server arrangement with another computer, etc. All of these configurations, as well as the appropriate communications hardware and software, are known in the art.

Figure 2:
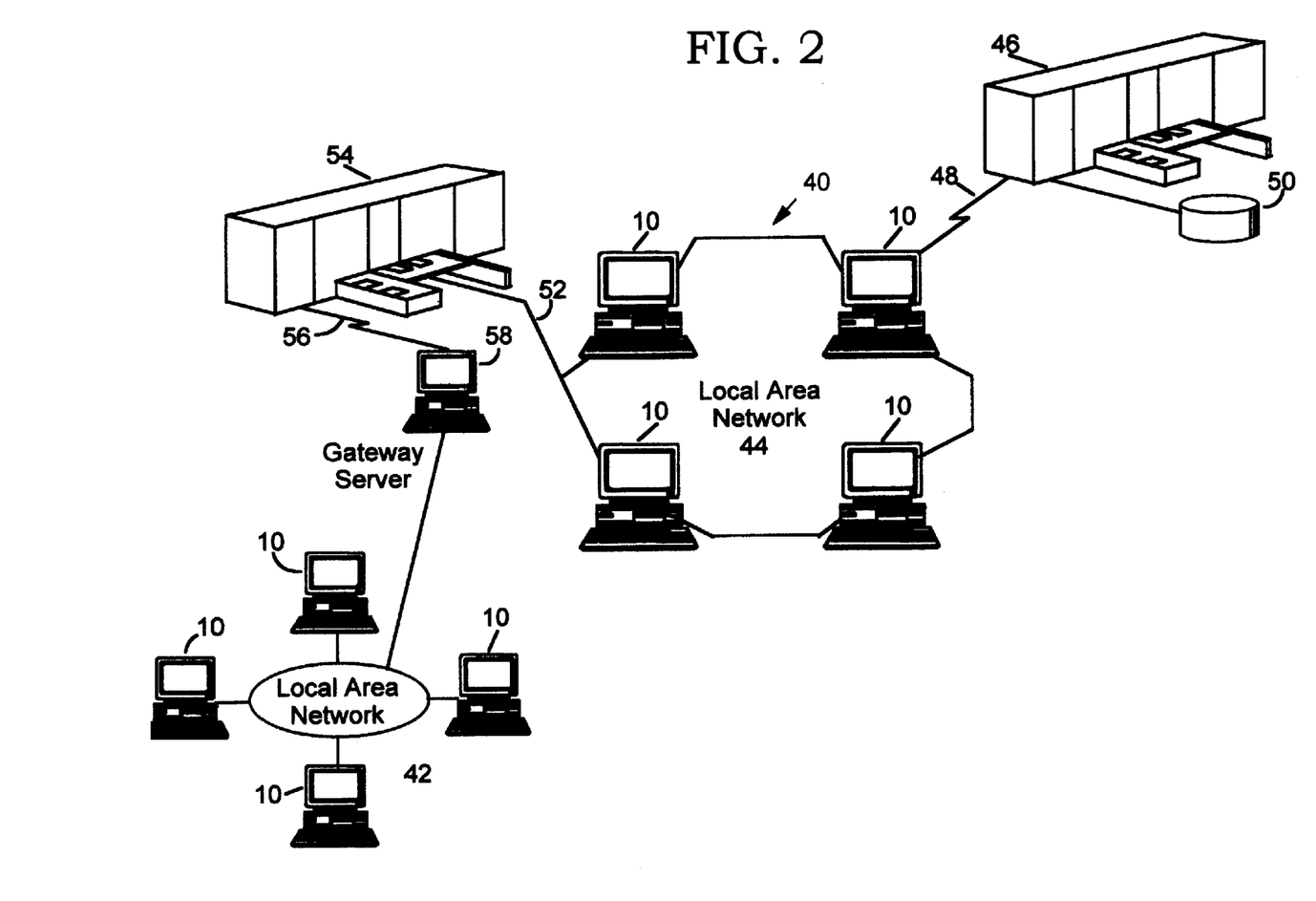
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400", and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically accessed by the microprocessor 12 of the workstation 10 from long-term storage media 30 of some type, such as a CD-ROM drive or hard drive. In a client-server environment, such software programming code may be stored with storage associated with a server. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The user profiles resulting from use of the present invention may be stored on any of the various media types used by the long-term storage 30, or may be sent from the server to another computer or workstation of the network illustrated in FIG. 2 over the communications channel 32, for storage by that other computer or workstation.

The preferred embodiment of the present invention will now be discussed with reference to FIGS. 3 through 5.

In the preferred embodiment, the present invention is implemented as a computer software program. This program will be used where software application(s) running on a Web server respond to a user's request, optionally perform some type of processing that results in dynamically-generated content in the response, and format the data that is to be returned to the user for display. According to the present invention, the user's behavior when accessing the application(s) on the server is monitored and recorded. The implementation of the logic for performing the monitoring and recording function may be integrated with the code of the server application, as one or more modules (also referred to as code subroutines, or "objects" in object-oriented programming) which are invoked during execution of the server application. Alternatively, the logic may be implemented as a separate utility program, which provides services that are accessed by the server application. The implementation will typically execute on a computer functioning as a Web server, where that Web server provides services in response to requests from a client using a Web browser connected to the Internet. Alternatively, the connection may be to a corporate intranet or extranet (that is, a network owned or managed by the user's company or another company, respectively) of which the user's computer is a component, where this corporate intranet or extranet provides services in a similar manner to the Internet. Use of the term "Internet" herein, when discussing processing associated with the user's request, includes processing that occurs in an intranet or extranet, unless otherwise stated. Client requests will typically be sent to the host server using the HTTP protocol. However, because the present invention operates independently of the mechanism used to fetch the data, other protocols such as FTP (File Transfer Protocol), Gopher, etc., may also be used without deviating from the inventive concepts defined herein.

Figure 3:
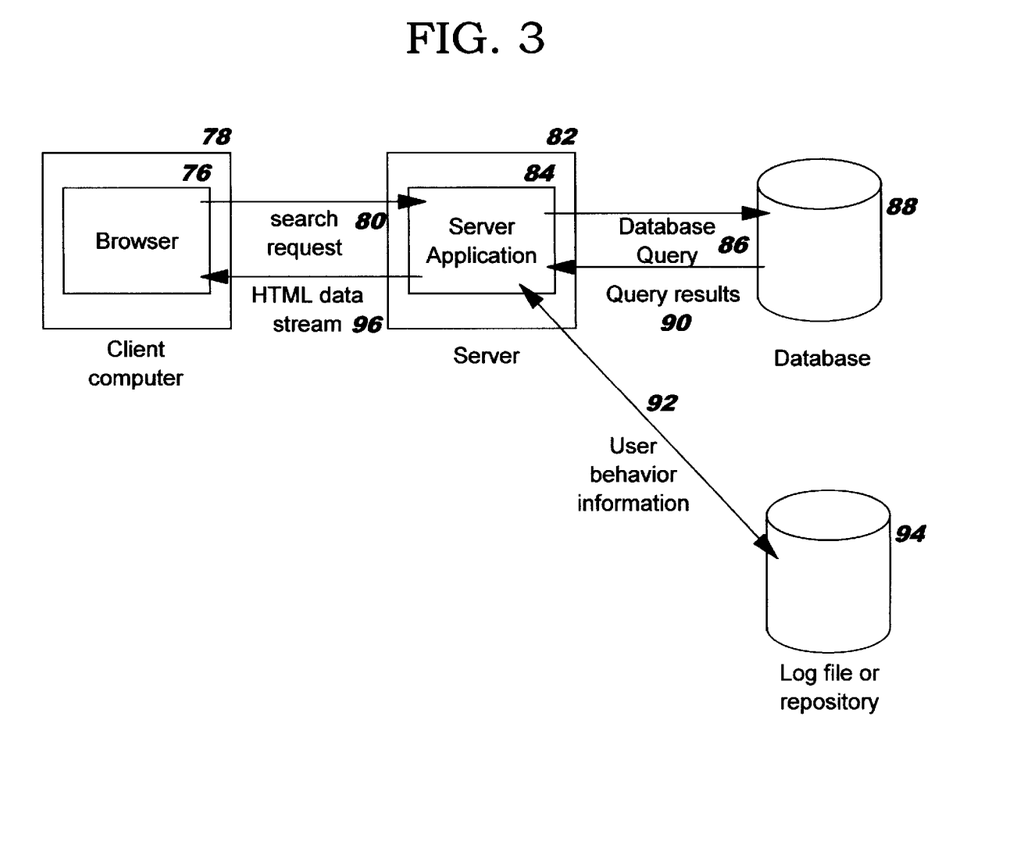
FIG. 3 illustrates a client-server model with which user requests for Web pages are processed according to the prior art.

FIG. 3 illustrates a client-server model with which user requests for Web pages are processed according to the prior art. The client software, referred to herein as a browser 76, resides on the user's client computer 78, and allows the user to create a request 80 and send that request into the Internet for processing.

The request 80 reaches a server 82 and server application 84 capable of fulfilling the request. The manner in which the appropriate server 82 and server application 84 are located, and the manner in which the request 80 reaches the server application 84, are well known in the art. The client request 80 specifies a URL, identifying the destination server 82 and server application 84. The server application 84 receives the request 80, performs processing (which may include accessing a database 88, as shown in FIG. 3) that dynamically generates Web page content, and formats that result into an HTML data stream 96. This HTML data stream is then sent back to the client computer 78, where the browser 76 processes the HTML to display the formatted results to the user. The manner in which the request 80 is processed to create the dynamic page content does not form part of the present invention. The server application 84 generates a record 92 that identifies the client (which may include the address of the client computer 78), and the URL to which the request 80 was sent. This record is then logged in the file or repository 94. The server application 84 may use these records 92 as input, to create customized dynamic page content.

Figure 4:
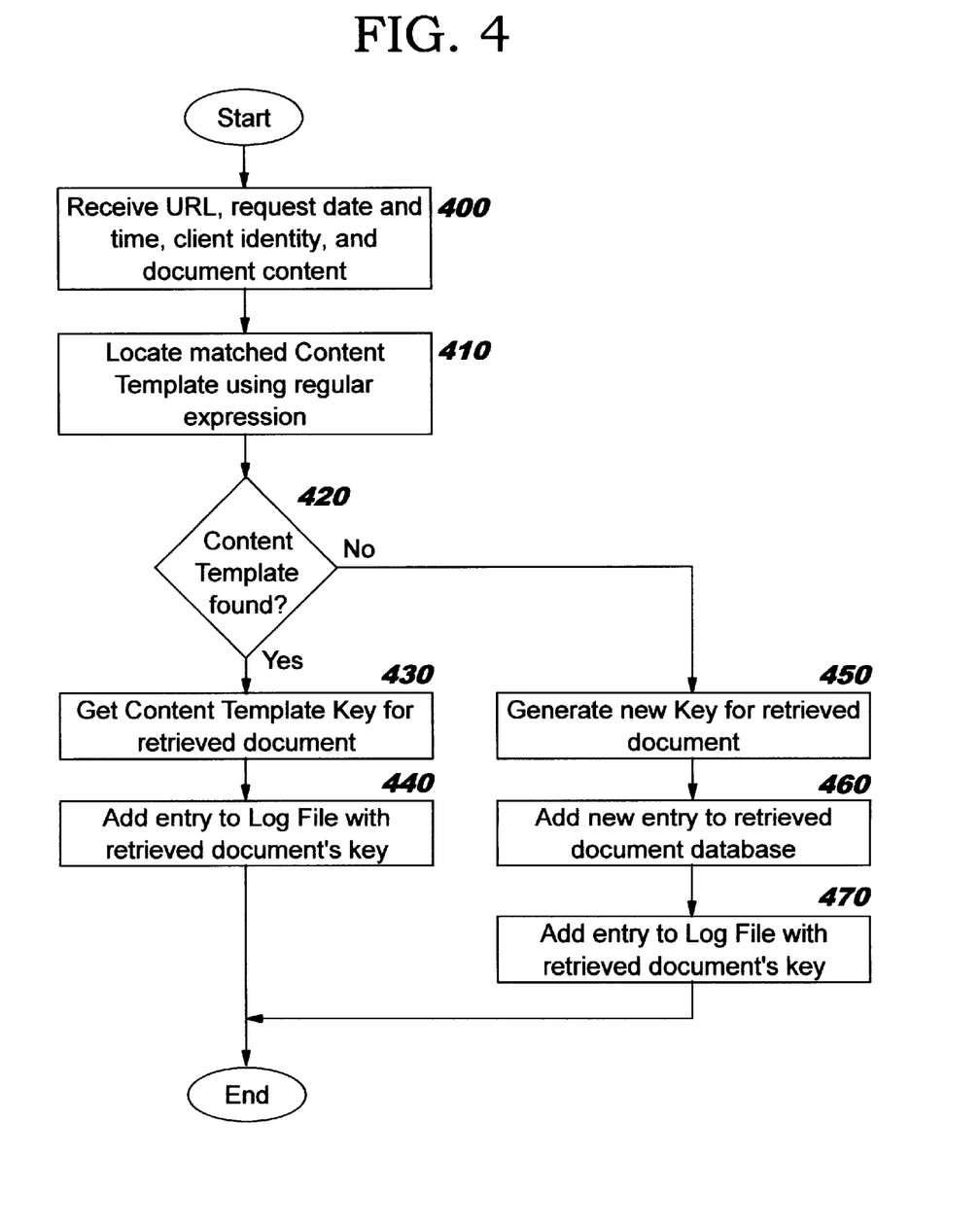
FIG. 4 illustrates a flow chart which sets forth the logic involved with a preferred embodiment of the present invention to monitor and record user behavior in the presence of dynamic page content.

FIG. 4 illustrates the logic used by a preferred embodiment of the present invention to monitor and record user behavior when page content may be dynamic, such that the prior art technique of recording the URL for static pages is insufficient.

The process begins at Block 400, when the user's request has already been received by the server application, and the dynamic page content has already been generated. The results may have been returned to the user already, or they may be returned following the processing of FIG. 4, without deviating from the inventive concepts of the present invention. Information required by the preferred embodiment for profiling the user's behavior with dynamic page content data is received at Block 400. If the implementation is integrated within the server application, this information may be made available by passing it as parameters on a subroutine invocation or method call, it may be available by accessing variables in shared storage, etc. If the implementation is a stand-alone utility which is being accessed by the server application, then the information received at Block 400 is preferably passed as parameters, but may also be made available through shared storage. These techniques are well known in the art.

The information regarding the user's behavior which is pertinent to the preferred embodiment comprises: (1) the URL which was accessed by the user's request; (2) the time and date of the user's request; (3) the user's identification; and (4) the dynamic content that was generated for the Web page.

Block 410 uses the dynamic page content, and compares it to the existing content templates, attempting to find a template which matches this page.

When regular expressions are used to define syntax requirements (for example, specifying the syntax of a programming language), techniques for using the regular expressions to parse an input stream of characters and compare it against the syntax requirements are well known in the art. Such techniques are used in compilers for programming languages, and implementations are commercially available. The present invention uses this approach to compare the page content requirements defined by a template, word by word, against the content of a dynamically-generated page.

A person such as a Web administrator creates content templates for use with the present invention, using his knowledge of the general HTML syntax of the Web pages that will be created by a given Web application. These content templates are then stored in a document database or repository. A content template resembles an HTML page, but uses a regular expression syntax to describe the dynamic aspects of the page content. This enables use of wild-card substitution during the matching operation of Block 410 for words, phrases, or sections that may differ from one dynamically-created instance of a given page to another. Thus, the administrator is defining equivalence classes for page content, whereby the general style for a page is specified but variations that are deemed insignificant can be ignored. Suppose, for example, that the only dynamic content in a given page is the date and time. Based on the details of the server application, this information may not be significant to the behavior profiling process. The administrator can create a content template that treats all versions of this page as equivalent, by indicating that a wild card is to be used for the date and time fields during the comparison process for this page. (In other situations, the date and time may be significant to the profiling process, in which case the content template would not use a wild card for these values.)

The regular expression syntax uses tags which specify how the comparison process is to occur. In the preferred embodiment, two tags are defined. A first tag specifies that a single word from the dynamically-created document is to be "skipped over" in the matching operation—that is, the wild card matches one and only one word. A second tag specifies that one or more words from the document will match this wild card. The first tag will be useful, for example, for skipping over a user account number when that appears as a single word that is to be treated as insignificant for equivalence purposes. The multi-word match will be useful, using an example described earlier, for pages that contain additional phrases or sections with detailed information for users who are "members" or "registered". These detailed pages can be treated as equivalent to those provided to non-members by defining regular expressions in the content template that will ignore the member-specific text. (Note that while "words" are referred to herein, this is for ease of reference. Numeric data and special characters are to be treated similarly. These items may equivalently be referred to as "tokens".)

In the preferred embodiment, the syntax used for the first tag is "<!--*-->", and the second tag is "<!--**-->"(where the quotation marks do not form part of the syntax). An alternative syntax may be used for specifying these tags, without deviating from the inventive concepts disclosed herein. Further, additional tags may be defined having other semantics, according to the teachings of the present invention. For example, a tag syntax might be created which specifies matching exactly two words, or between three and five words, depending on the details of how the dynamic content will be created for a particular application. Using regular expression syntax for these tags enables them to be processed according to well-understood techniques.

Block 410 compares the dynamically generated page content (which was received at Block 400) against a single content template. The single URL received in Block 400 is used to retrieve one specific template from the document database prior to beginning the comparison process, which then ends after comparing the dynamic page to this single template.

Figure 5A:
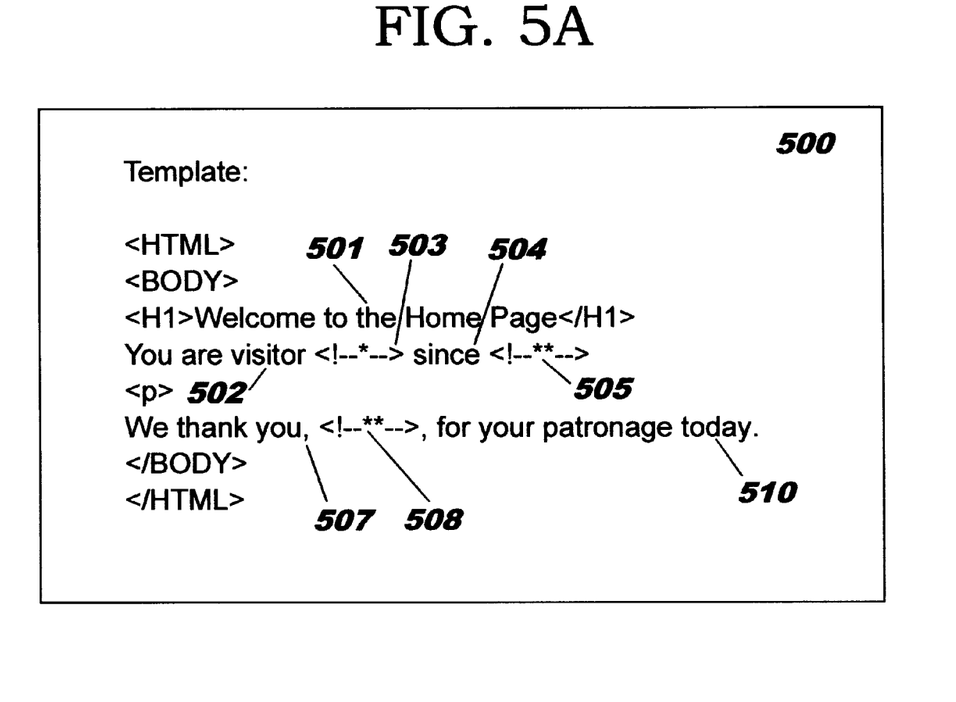
FIGS. 5A, 5B, 5C and 5D illustrate an example of how a content template created can be used with dynamic page content according to the present invention.

FIGS. 5A–5D illustrate how this process works, using an example template and three different dynamically-generated pages. FIG. 5A contains a template 500, defining the layout of a simple page using HTML. The "<!--*-->" tag defined by the present invention appears once in this template, at 503, and the "<!---->" tag appears twice, at 505 and 508. An equivalence class is thereby defined. This allows, according to the above definitions of the tag syntax, (1) any single word to be treated as equivalent (i.e. as a "match") at the position where the first tag 503 appears, and (2) any one or more words to be treated as equivalent at the positions where the second tag 505, 508** appears.

As stated previously, the matching is a word-by-word comparison process that uses the content templates. Thus, if a mismatch is found before a tag is encountered, the tag will not be processed. For example, suppose the page began with the text "Welcome to my Home Page". A mismatch between "the" in the template 500 at 501, and "my" in the page, would be detected. This page would therefore not fall into the equivalence class for this template 500, and the matching process would fail. On the other hand, provided that all the comparisons up through and including the word "visitor" 502 from this template successfully match a page, the comparison process continues, and the next single word in the page will match the wildcard tag 503. Thus, the three example pages in FIGS. 5B–5D all match the template up to the point 522, 542, and 562. The three distinct single words 523, 543, 563 are treated as equivalent using the tag 503, allowing the matching process to ignore these distinct values. The matching will continue, looking for the next word to be "since" as specified by the template at 504.

Figure 5B:
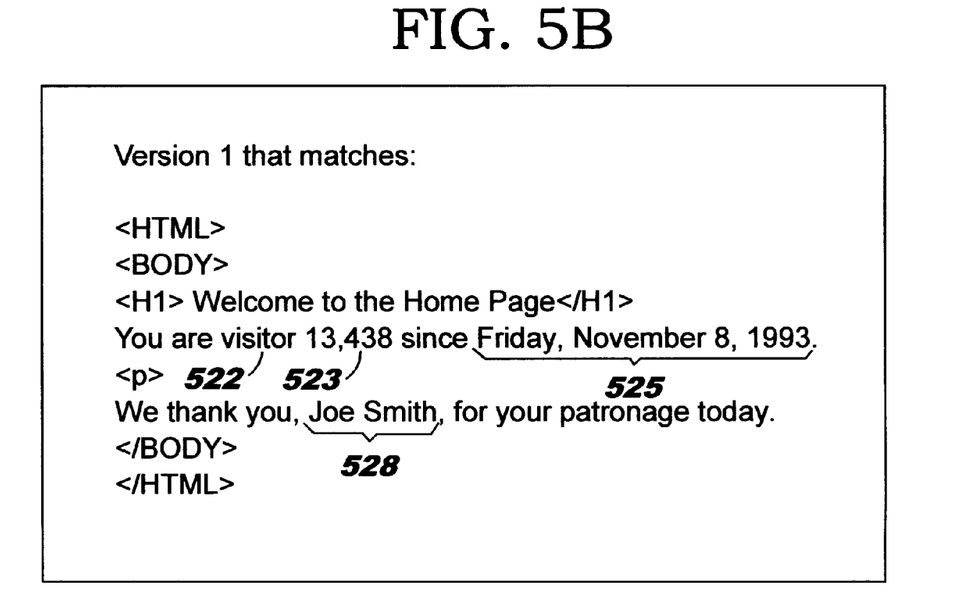
Figure 5C:
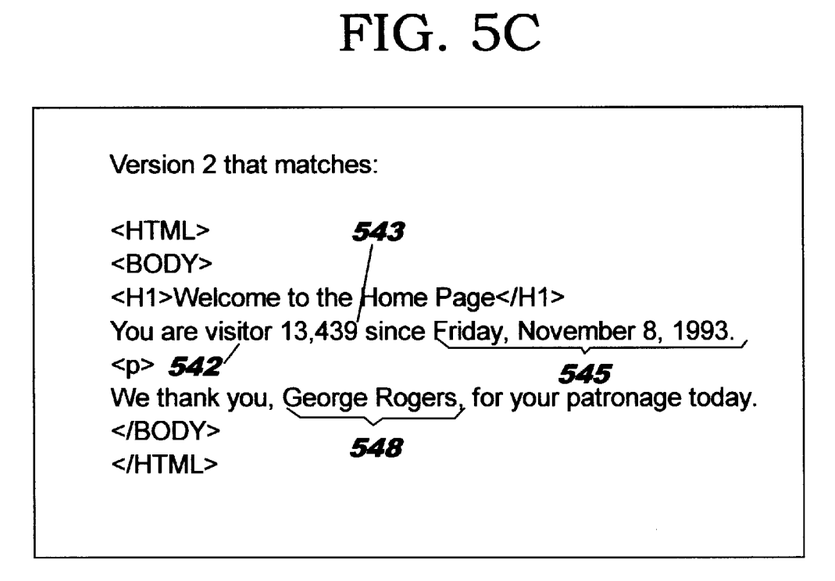
Figure 5D:
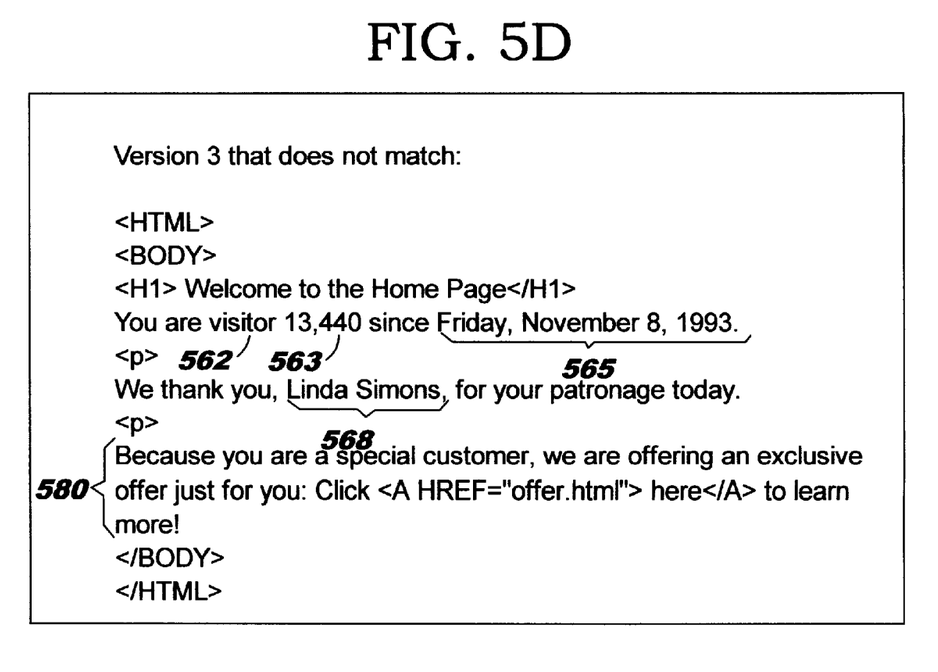

Each of the examples in FIGS. 5B–5D also continue to match, up through and including the final word "today." specified by the template 500 at 510. As can be seen from the examples, the tag 505 has treated as equivalent the multiple-word phrases at 525, 545, and 565, and the tag 508 has treated as equivalent the phrases at 528, 548, and 568. The person creating the template 500 specified it to allow this equivalence (and that using tag 503, described above), thus indicating that the specific values used in the page as a visitor counter and date are not significant.

The page shown in FIG. 5D contains additional text 580, beyond that specified in the template 500. Therefore, the matching process will fail for this page: it does not fall into template 500's equivalence class.

Returning now to the process of FIG. 4, Block 420 asks whether the comparison process of Block 410 located a matching content template. When this query has a positive response, control continues at Block 430; otherwise, control transfers to Block 450.

Block 430 is reached when the user has accessed a Web page which matches an existing content template. This fact will now be recorded, as part of tracking this user's behavior patterns and accounting for the dynamic page content which the user received while navigating this site. Block 430 retrieves a key, or identifier, that has previously been associated with the matching content template. This key provides a shorthand technique for identifying the content template, and enables optimizing the amount of space required to record the user profiling information. Block 440 adds an entry to the log file (or other type of data repository) of user behavior. According to the preferred embodiment, this entry comprises the URL, request time and date, and client identification obtained in Block 400, and the content template key retrieved at Block 430. The manner in which the entry is formatted may vary without deviating from the inventive concepts of the present invention, and the process of adding the entry to the file uses techniques which are well known in the art.

Block 450 is reached when none of the existing content templates matched the document content received at Block 400. Block 450 generates a new key to identify the dynamic content of this page. Block 460 then adds the page, as a new content template, to the document database (or other repository) which contains the collection of existing content templates. Block 470 adds an entry to the log file (or other type of data repository) of user behavior, including the same type of information which was written to the log at Block 440.

Following completion of Block 440 or Block 470, the processing of this user request is now complete, and the process of FIG. 4 ends. It will be obvious to one of ordinary skill in the art that the process of FIG. 4 is invoked again for each user request being profiled.

In an optional aspect of the preferred embodiment, the URL of the dynamically-generated page can be ignored as part of the template matching process of Block 410. This may be appropriate when, for example, URLs include session identifier ("session ID") information, or when different servlets (each having different URLs) are used in order to access different physical databases. In this situation, Block 410 is repeated for each defined content template. When this matching process is unsuccessful using one template, it will be repeated using another template, until either a match is found or no more templates remain. It will be obvious to one of ordinary skill in the art how this looping process may be used with Block 410.

In a further aspect of the preferred embodiment, it may be desirable to include context-specific information which does not occur within the dynamic page content as part of the matching process. For example, it may be useful to treat as equivalent only those pages generated in response to a request occurring during one or more specific sessions, or pages generated from one or more specific referral page URLs. This can be accomplished by specifying a regular expression for the contextual information (and, obviously, ensuring that the contextual information is made available to the embodiment of the present invention). The defined content templates will include regular expressions for this additional data, so that the process of Block 410 can process them as part of the requirements for a successful match.

According to one aspect of the preferred embodiment, the page content templates defined by the Web administrator may be specified as states and transitions in a finite state machine ("FSM"). FSM tools which allow specifying this type of input are known in the art. This FSM can be compiled, using FSM compilers that exist in the art. The resulting executable code can then be used to perform the matching process of Block 410 in an optimal manner.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. In a computing environment capable of having a connection to a network, computer readable code readable by a computer system in said environment and embodied on computer readable media, for profile management in the presence of dynamic page content, comprising:

one or more content templates, wherein each of said content templates defines an equivalence class by using one or more regular expressions to describe page content in said content template;

a subprocess for comparing one or more of said templates to one or more dynamically-generated pages; and a subprocess for creating a user profile entry using a result of said comparing.

2. Computer readable code for profile management in the presence of dynamic page content according to claim 1, wherein one of said regular expressions indicates a wildcard treatment for at least one token.

3. Computer readable code for profile management in the presence of dynamic page content according to claim 1, further comprising a subprocess for creating a new content template from said page when said comparison has a negative result.

4. Computer readable code for profile management in the presence of dynamic page content according to claim 1, wherein said user profile entry comprises information about a behavior pattern of a user.

5. Computer readable code for profile management in the presence of dynamic page content according to claim 4, wherein a collection of said user profile entries is for use by a site monitoring tool.

6. Computer readable code for profile management in the presence of dynamic page content according to claim 1, wherein said subprocess for comparing further comprises using a selected one of said templates based on a Uniform Resource Locator which was used to access said page.

7. Computer readable code for profile management in the presence of dynamic page content according to claim 1, wherein said subprocess for comparing further comprises comparing said page to each of said templates until either a match or a failure condition is detected, without regard to a Uniform Resource Locator which was used to access said page.

8. Computer readable code for profile management in the presence of dynamic page content according to claim 1, wherein said subprocess for comparing further comprises using one or more context-specific values.

9. Computer readable code for profile management in the presence of dynamic page content according to claim 1, wherein one of said regular expressions indicates a wild-card treatment for a single token.

10. A system for profile management in the presence of dynamic page content in a computing environment capable of having a connection to a network, comprising:

one or more content templates, wherein each of said content templates defines an equivalence class by using one or more regular expressions to describe page content in said content template;

means for comparing one or more of said templates to one or more dynamically-generated pages; and means for creating a user profile entry using a result of said comparing.

11. The system for profile management in the presence of dynamic page content according to claim 10, wherein said means for comparing further comprises using one or more context-specific values.

12. The system for profile management in the presence of dynamic page content according to claim 10, wherein one of said regular expressions indicates a wild-card treatment for a single token.

13. The system for profile management in the presence of dynamic page content according to claim 10, wherein one of said regular expressions indicates a wild-card treatment for at least one token.

14. The system for profile management in the presence of dynamic page content according to claim 10, further comprising means for creating a new content template from said page when said comparison has a negative result.

15. The system for profile management in the presence of dynamic page content according to claim 10, wherein said user profile entry comprises information about a behavior pattern of a user.

16. The system for profile management in the presence of dynamic page content according to claim 15, wherein a collection of said user profile entries is for use by a site monitoring tool.

17. The system for profile management in the presence of dynamic page content according to claim 10, wherein said means for comparing further comprises using a selected one of said templates based on a Uniform Resource Locator which was used to access said page.

18. The system for profile management in the presence of dynamic page content according to claim 10, wherein said means for comparing further comprises comparing said page to each of said templates until either a match or a failure condition is detected, without regard to a Uniform Resource Locator which was used to access said page.

19. A method for profile management in the presence of dynamic page content in a computing environment capable of having a connection to a network, comprising the steps of:

comparing one or more content templates to one or more dynamically-generated pages, wherein each of said content templates defines an equivalence class by using one or more regular expressions to describe page content in said content template; and creating a user profile entry using a result of said comparing.

20. The method for profile management in the presence of dynamic page content according to claim 19, wherein said user profile entry comprises information about a behavior pattern of a user.

21. The method for profile management in the presence of dynamic page content according to claim 20, wherein a collection of said user profile entries is for use by a site monitoring tool.

22. The method for profile management in the presence of dynamic page content according to claim 19, wherein said comparing step further comprises using a selected one of said templates based on a Uniform Resource Locator which was used to access said page.

23. The method for profile management in the presence of dynamic page content according to claim 19, wherein said comparing step further comprises comparing said page to each of said templates until either a match or a failure condition is detected, without regard to a Uniform Resource Locator which was used to access said page.

24. The method for profile management in the presence of dynamic page content according to claim 19, wherein said comparing step further comprises using one or more context-specific values.

25. The method for profile management in the presence of dynamic page content according to claim 19, wherein one of said regular expressions indicates a wild-card treatment for a single token.

26. The method for profile management in the presence of dynamic page content according to claim 19, wherein one of said regular expressions indicates a wild-card treatment for at least one token.

27. The method for profile management in the presence of dynamic page content according to claim 19, further comprising a step of creating a new content template from said page when said comparison has a negative result.

\* \* \* \* \*

UNITED STATES PATENT AND TRADEMARK OFFICE
CERTIFICATE OF CORRECTION

PATENT NO. : 6,286,043 B1
DATED : September 4, 2001
INVENTOR(S) : Gennaro Cuomo et al.

It is certified that error appears in the above-identified patent and that said Letters Patent is hereby corrected as shown below:

Column 10, lines 38 through Column 12, line 56,
Delete claims 1-27 and substitute therefore the attached claims 1-27.

Signed and Sealed this

Fifteenth Day of April, 2003

JAMES E. ROGAN
*Director of the United States Patent and Trademark Office* allowing the matching process to ignore these distinct values. The matching will continue, looking for the next word to be "since" as specified by the template at 504.

Each of the examples in FIGS. 5B–5D also continue to match, up through and including the final word "today." specified by the template 500 at 510. As can be seen from the examples, the tag 505 has treated as equivalent the multiple-word phrases at 525, 545, and 565, and the tag 508 has treated as equivalent the phrases at 528, 548, and 568. The person creating the template 500 specified it to allow this equivalence (and that using tag 503, described above), thus indicating that the specific values used in the page as a visitor counter and date are not significant.

The page shown in FIG. 5D contains additional text 580, beyond that specified in the template 500. Therefore, the matching process will fail for this page: it does not fall into template 500's equivalence class.

Returning now to the process of FIG. 4, Block 420 asks whether the comparison process of Block 410 located a matching content template. When this query has a positive response, control continues at Block 430; otherwise, control transfers to Block 450.

Block 430 is reached when the user has accessed a Web page which matches an existing content template. This fact will now be recorded, as part of tracking this user's behavior patterns and accounting for the dynamic page content which the user received while navigating this site. Block 430 retrieves a key, or identifier, that has previously been associated with the matching content template. This key provides a shorthand technique for identifying the content template, and enables optimizing the amount of space required to record the user profiling information. Block 440 adds an entry to the log file (or other type of data repository) of user behavior. According to the preferred embodiment, this entry comprises the URL, request time and date, and client identification obtained in Block 400, and the content template key retrieved at Block 430. The manner in which the entry is formatted may vary without deviating from the inventive concepts of the present invention, and the process of adding the entry to the file uses techniques which are well known in the art.

Block 450 is reached when none of the existing content templates matched the document content received at Block 400. Block 450 generates a new key to identify the dynamic content of this page. Block 460 then adds the page, as a new content template, to the document database (or other repository) which contains the collection of existing content templates. Block 470 adds an entry to the log file (or other type of data repository) of user behavior, including the same type of information which was written to the log at Block 440.

Following completion of Block 440 or Block 470, the processing of this user request is now complete, and the process of FIG. 4 ends. It will be obvious to one of ordinary skill in the art that the process of FIG. 4 is invoked again for each user request being profiled.

In an optional aspect of the preferred embodiment, the URL of the dynamically-generated page can be ignored as part of the template matching process of Block 410. This may be appropriate when, for example, URLs include session identifier ("session ID") information, or when different servlets (each having different URLs) are used in order to access different physical databases. In this situation, Block 410 is repeated for each defined content template. When this matching process is unsuccessful using one template, it will be repeated using another template, until either a match is found or no more templates remain. It will be obvious to one of ordinary skill in the art how this looping process may be used with Block 410.

In a further aspect of the preferred embodiment, it may be desirable to include context-specific information which does not occur within the dynamic page content as part of the matching process. For example, it may be useful to treat as equivalent only those pages generated in response to a request occurring during one or more specific sessions, or pages generated from one or more specific referral page URLs. This can be accomplished by specifying a regular expression for the contextual information (and, obviously, ensuring that the contextual information is made available to the embodiment of the present invention). The defined content templates will include regular expressions for this additional data, so that the process of Block 410 can process them as part of the requirements for a successful match.

According to one aspect of the preferred embodiment, the page content templates defined by the Web administrator may be specified as states and transitions in a finite state machine ("FSM"). FSM tools which allow specifying this type of input are known in the art. This FSM can be compiled, using FSM compilers that exist in the art. The resulting executable code can then be used to perform the matching process of Block 410 in an optimal manner.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. In a computing environment capable of having a connection to a network, computer readable code readable by a computer system in said environment and embodied on computer readable media, for profile management in the presence of dynamic page content, comprising:

one or more content templates, wherein each of said content templates defines an equivalence class by using one or more regular expressions to describe page content in said content template;

a subprocess for comparing one or more of said templates to one or more dynamically-generated pages; and     a subprocess for creating a user profile entry using a result of said comparing.

2. Computer readable code for profile management in the presence of dynamic page content according to claim 1, wherein said user profile entry comprises information about a behavior pattern of a user.

3. Computer readable code for profile management in the presence of dynamic page content according to claim 2, wherein a collection of said user profile entries is for use by a site monitoring tool.

4. Computer readable code for profile management in the presence of dynamic page content according to claim 1, wherein said subprocess for comparing further comprises using a selected one of said templates based on a Uniform Resource Locator which was used to access said page.

5. Computer readable code for profile management in the presence of dynamic page content according to claim 1, wherein said subprocess for comparing further comprises comparing said page to each of said templates until either a match or a failure condition is detected, without regard to a Uniform Resource Locator which was used to access said page.

6. Computer readable code for profile management in the presence of dynamic page content according to claim 1, wherein said subprocess for comparing further comprises using one or more context-specific values.

7. Computer readable code for profile management in the presence of dynamic page content according to claim 1, wherein one of said regular expressions indicates a wild-card treatment for a single token.

8. Computer readable code for profile management in the presence of dynamic page content according to claim 1, wherein one of said regular expressions indicates a wild-card treatment for at least one token.

9. Computer readable code for profile management in the presence of dynamic page content according to claim 1, further comprising a subprocess for creating a new content template from said page when said comparison has a negative result.

10. A system for profile management in the presence of dynamic page content in a computing environment capable of having a connection to a network, comprising:
   one or more content templates, wherein each of said content templates defines an equivalence class by using one or more regular expressions to describe page content in said content template;
   means for comparing one or more of said templates to one or more dynamically-generated pages; and
   means for creating a user profile entry using a result of said comparing.

11. The system for profile management in the presence of dynamic page content according to claim 10, wherein said user profile entry comprises information about a behavior pattern of a user.

12. The system for profile management in the presence of dynamic page content according to claim 11, wherein a collection of said user profile entries is for use by a site monitoring tool.

13. The system for profile management in the presence of dynamic page content according to claim 10, wherein said means for comparing further comprises using a selected one of said templates based on a Uniform Resource Locator which was used to access said page.

14. The system for profile management in the presence of dynamic page content according to claim 10, wherein said means for comparing further comprises comparing said page to each of said templates until either a match or a failure condition is detected, without regard to a Uniform Resource Locator which was used to access said page.

15. The system for profile management in the presence of dynamic page content according to claim 10, wherein said means for comparing further comprises using one or more context-specific values.

16. The system for profile management in the presence of dynamic page content according to claim 10, wherein one of said regular expressions indicates a wild-card treatment for a single token.

17. The system for profile management in the presence of dynamic page content according to claim 10, wherein one of said regular expressions indicates a wild-card treatment for at least one token.

18. The system for profile management in the presence of dynamic page content according to claim 10, further comprising means for creating a new content template from said page when said comparison has a negative result.

19. A method for profile management in the presence of dynamic page content in a computing environment capable of having a connection to a network, comprising the steps of:
   comparing one or more content templates to one or more dynamically-generated pages, wherein each of said content templates defines an equivalence class by using one or more regular expressions to describe page content in said content template; and
   creating a user profile entry using a result of said comparing.

20. The method for profile management in the presence of dynamic page content according to claim 19, wherein said user profile entry comprises information about a behavior pattern of a user.

21. The method for profile management in the presence of dynamic page content according to claim 19, wherein said comparing step further comprises using a selected one of said templates based on a Uniform Resource Locator which was used to access said page.

22. The method for profile management in the presence of dynamic page content according to claim 19, wherein said comparing step further comprises using a selected one of said templates based on a Uniform Resource Locator which was used to access said page.

23. The method for profile management in the presence of dynamic page content according to claim 19, wherein said comparing step further comprises comparing said page to each of said templates until either a match or a failure condition is detected, without regard to a Uniform Resource Locator which was used to access said page.

24. The method for profile management in the presence of dynamic page content according to claim 19, wherein said comparing step further comprises using one or more context-specific values.

25. The method for profile management in the presence of dynamic page content according to claim 19, wherein one of said regular expressions indicates a wild-card treatment for a single token.

26. The method for profile management in the presence of dynamic page content according to claim 19, wherein one of said regular expressions indicates a wild-card treatment for at least one token.

27. The method for profile management in the presence of dynamic page content according to claim 19, further comprising a step of creating a new content template from said page when said comparison has a negative result.

* * * * *